(12) United States Patent
Steyer et al.

(10) Patent No.: US 7,607,305 B2
(45) Date of Patent: Oct. 27, 2009

(54) ONE-PIECE BAFFLE INFRARED SUPPRESSOR APPARATUS AND METHOD

(75) Inventors: William Steyer, Topsfield, MA (US); Christopher Marlow Kieffer, Revere, MA (US); John Michael Jasany, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 721 days.

(21) Appl. No.: 11/196,218

(22) Filed: Aug. 3, 2005

(65) Prior Publication Data

US 2007/0028622 A1    Feb. 8, 2007

(51) Int. Cl.
*F02K 1/00*    (2006.01)
(52) U.S. Cl. .................. 60/770; 60/39.5; 239/265.17
(58) Field of Classification Search ............. 60/39.5, 60/770, 264, 771; 239/265.17, 265.19, 127.3; 181/213
See application file for complete search history.

(56) References Cited

U.S. PATENT DOCUMENTS

| 4,295,332 | A | | 10/1981 | Steyer et al. |
| 4,800,715 | A | * | 1/1989 | Conway ..................... 60/39.5 |
| 5,746,047 | A | * | 5/1998 | Steyer et al. ................. 60/39.5 |
| 6,253,540 | B1 | | 7/2001 | Chew et al. |
| 6,615,576 | B2 | * | 9/2003 | Sheoran et al. .............. 60/39.5 |
| 6,988,674 | B2 | * | 1/2006 | Steyer et al. ........... 239/265.19 |
| 7,114,323 | B2 | * | 10/2006 | Schlinker et al. ............. 60/204 |
| 7,313,909 | B2 | * | 1/2008 | Skoog et al. ................. 60/39.5 |
| 2007/0028623 | A1 | * | 2/2007 | Steyer et al. .................. 60/772 |

* cited by examiner

*Primary Examiner*—William H Rodriguez
(74) *Attorney, Agent, or Firm*—William Scott Andes, Esq.; Armstrong Teasdale LLP

(57) ABSTRACT

A method for suppressing infrared radiation from an aircraft engine includes directing hot exhaust from the aircraft engine into a lobed mixer of a single baffle infrared suppressor having a single baffle assembly to generate alternating flows of hot exhaust gas and cold air. The method further includes directing the alternating flows of hot exhaust gas and cold air towards the single baffle assembly to mix the hot exhaust gas with the cold air.

18 Claims, 13 Drawing Sheets

ONE-PIECE BAFFLE INFRARED SUPPRESSOR APPARATUS AND METHOD

BACKGROUND OF THE INVENTION

This invention relates generally to infrared suppression devices and more generally to methods and apparatus for reducing infrared emission from gas turbines such as those used, for example, in helicopters.

In some helicopters used in hostile environments, gear boxes under helicopter rotors are driven by gas turbine engines. These engines rotate at very high RPM, although the helicopter rotors themselves rotate at low RPM because of their diameter. The tailpipe of the gas turbine engines are exhausted overboard. The tailpipe becomes very hot from this hot exhaust gas and thus provides a very bright infrared signal.

With recent advancements in weapons detection technology, there is growing recognition of the importance of reducing the infrared signature associated with gas turbine engines powering military aircraft and land combat vehicles. Signature reductions reduce the possibility of detection and pursuit by enemy anti-aircraft forces including heat-seeking missiles. At least two known configurations have been used to suppress infrared radiation from gas turbine engines. One of these configurations has a center plug is disposed in an exhaust flow that cooperates to block a line of sight to hot turbine parts of the engine. Another blocks the line of sight by ejecting hot gases from the suppressor at a substantial angle from the axial center line of the engine.

An example of an infrared suppressor is disclosed in U.S. Pat. No. 4,295,332, Steyer et al, which describes the use of splitters that perform a dual function of mixing hot and cool gas flows to reduce gas temperatures and also block line-of-sight infrared radiation. Since the conception of the suppressor disclosed in U.S. Pat. No. 4,295,332, additional developments have made possible even more compact and higher performance suppressor construction arrangements. However, even as suppressor construction arrangements have improved, threats have also improved and engine exhaust gas temperatures have been increasing as requirements for increased power and reduced weight have been imposed.

BRIEF DESCRIPTION OF THE INVENTION

Some aspects of the present invention therefore provide a method for suppressing infrared radiation from an aircraft engine. The method includes directing hot exhaust from the aircraft engine into a lobed mixer of a single baffle infrared suppressor having a single baffle assembly to generate alternating flows of hot exhaust gas and cold air. The method further includes directing the alternating flows of hot exhaust gas and cold air towards the single baffle assembly to mix the hot exhaust gas with the cold air.

In another aspect, the present invention provides an infrared suppressor for an aircraft engine. The apparatus includes a lobed mixer and one single baffle assembly. The apparatus is further configured to direct hot exhaust from the aircraft engine into the lobed mixer to generate alternating flows of hot exhaust gas and cold air and to direct the alternating flows of hot exhaust gas and cold air towards the single baffle assembly to mix the hot exhaust gas with the cold air.

In yet another aspect, the present invention provides a method for suppressing infrared radiation from an aircraft engine. The method includes directing hot exhaust from the aircraft engine into a lobed mixer of a single baffle infrared suppressor having a single baffle assembly to generate alternating flows of hot exhaust gas and cold air. The method further includes directing the alternating flows of hot exhaust gas and cold air towards the single baffle assembly to mix the hot exhaust gas with the cold air and shielding lobes of the lobed mixer from a line of sight from an exit direction for the mixture of hot exhaust gas and cold air.

Those skilled in the art will come to appreciate that configurations of the present invention provide improved protection against threats even with increased engine exhaust gas temperatures and requirements for increased power and reduced overall weight.

DETAILED DESCRIPTION OF THE INVENTION

Figure 1:
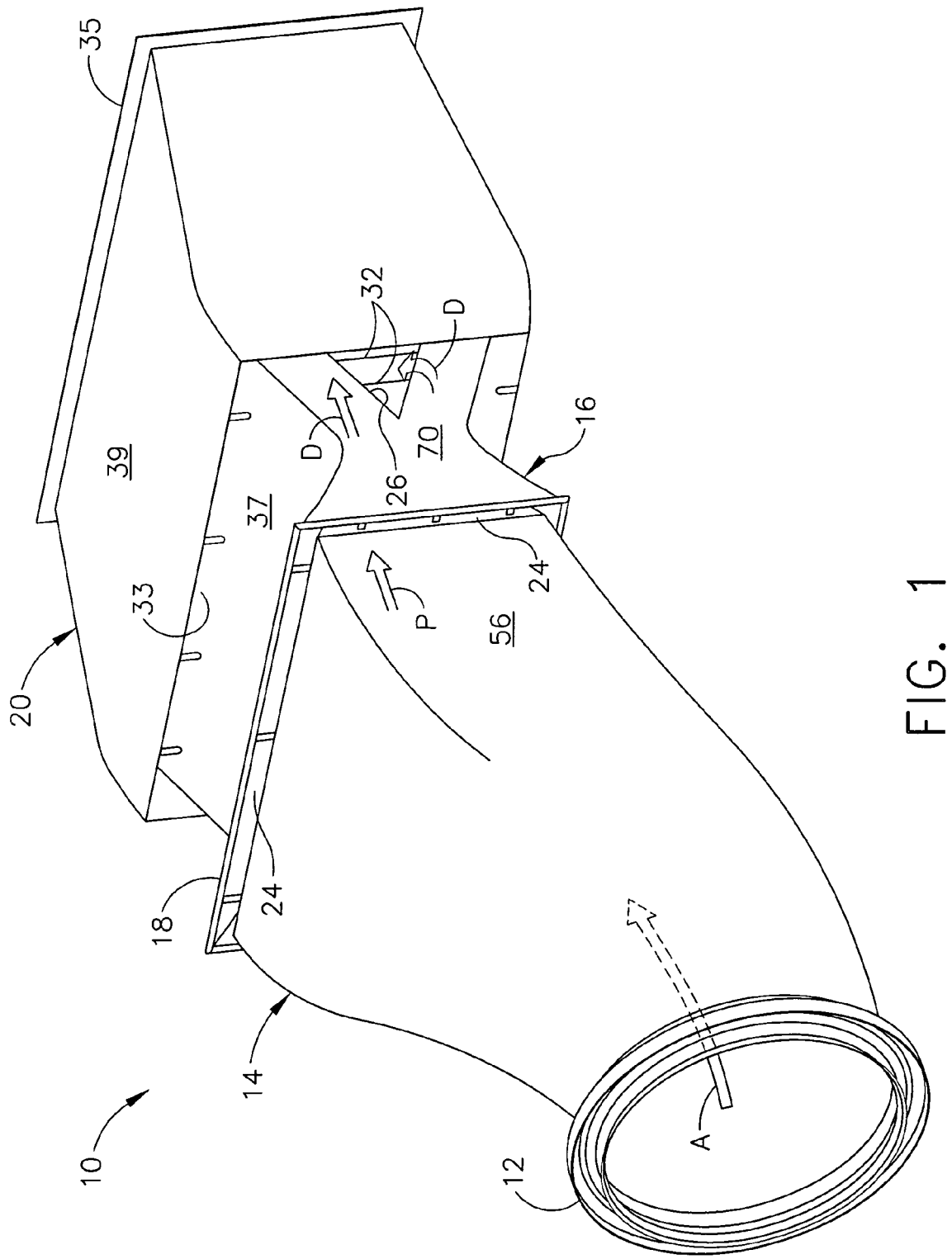
FIG. 1 is an isometric or 3-D view of an infrared suppressor assembly configuration of the present invention.

In some configurations and referring to FIG. 1, an infrared suppressor assembly 10 is fitted to the back end of a standard turboshaft or turboprop engine (not shown). An adapter ring 12 slides over the tailpipe of the turboshaft engine. Adapter ring 12 may comprise a finger seal having a plurality of metal strips (not shown) that fit over a cylindrical section of an engine and hold tight to it. The metal strips are mounted on a moveable disk, so that if the engine moves relative to suppressor assembly 10, adapter ring 12 takes up the movement. Hot exhaust gas from the jet engine thereby flows into a stage I duct 14 that transitions from a round shape to a rectangular shape in the natural direction of the exhaust flow. In some configurations, stage I duct 14 is straight, however, in other configurations, stage I duct 14 may be turned to facilitate guiding the exhaust flow from the engine and away from the aircraft.

Figure 2:
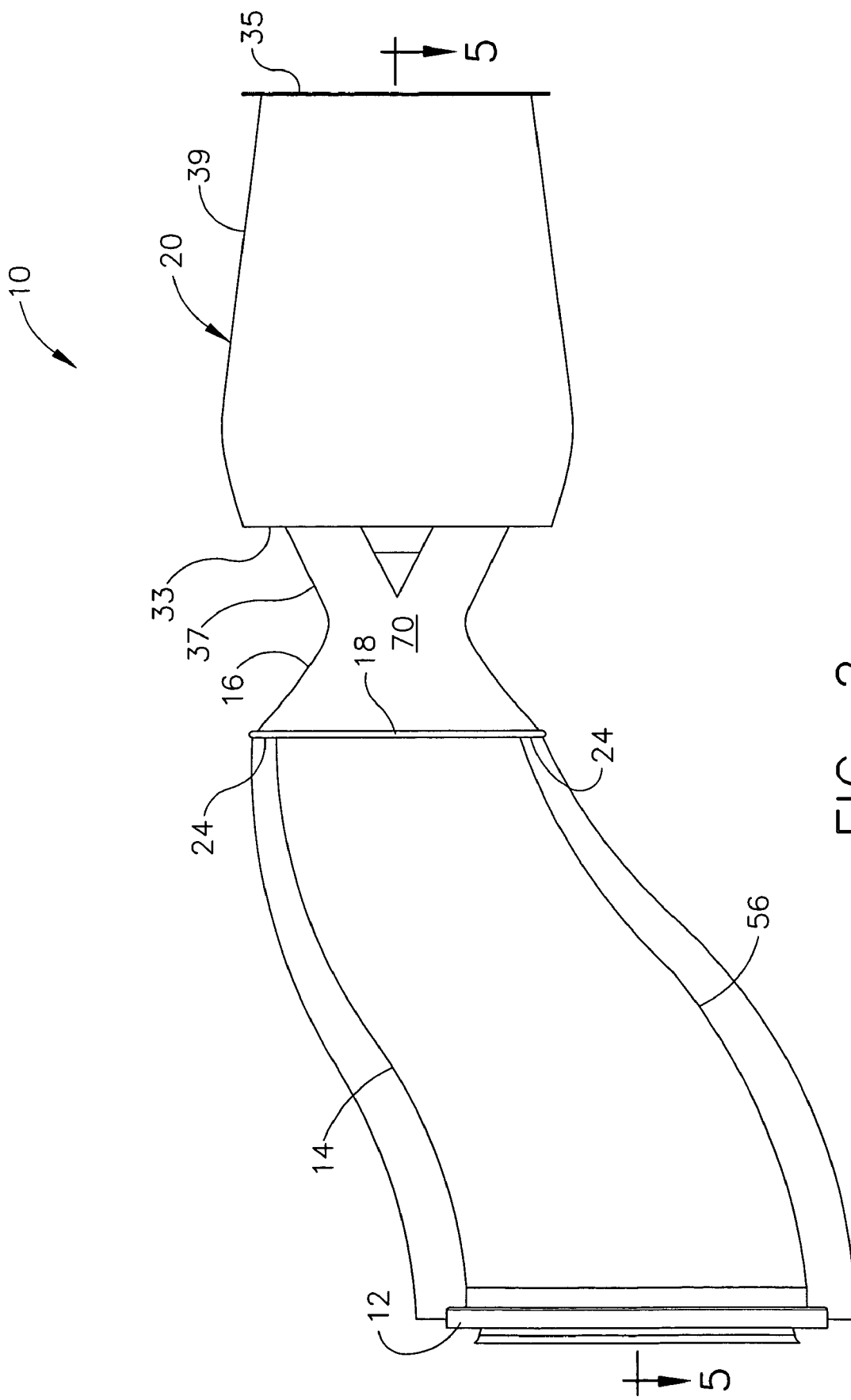
FIG. 2 is a side elevation view of infrared suppressor assembly configuration of FIG. 1.

FIG. 2 is a side elevation view of infrared suppressor assembly 10 of FIG. 1. A stage II duct 16 having a rectangular opening 18 and wall 37 (FIG. 3) receives exhaust from the jet engine that leaves stage I duct 14. Stage II duct 16 exhausts into a Stage III duct 20 that includes wall 39 and, among other things, physical barriers that prevent infrared sensors from looking up into infrared suppressor assembly 10 and using infrared sensors to observe hot parts of the jet engine (not shown in FIG. 2 but described in conjunction with other figures below). Stage I duct 14 fits into stage II duct 16 which, in turn, fits into stage III duct 20.

Figure 3:
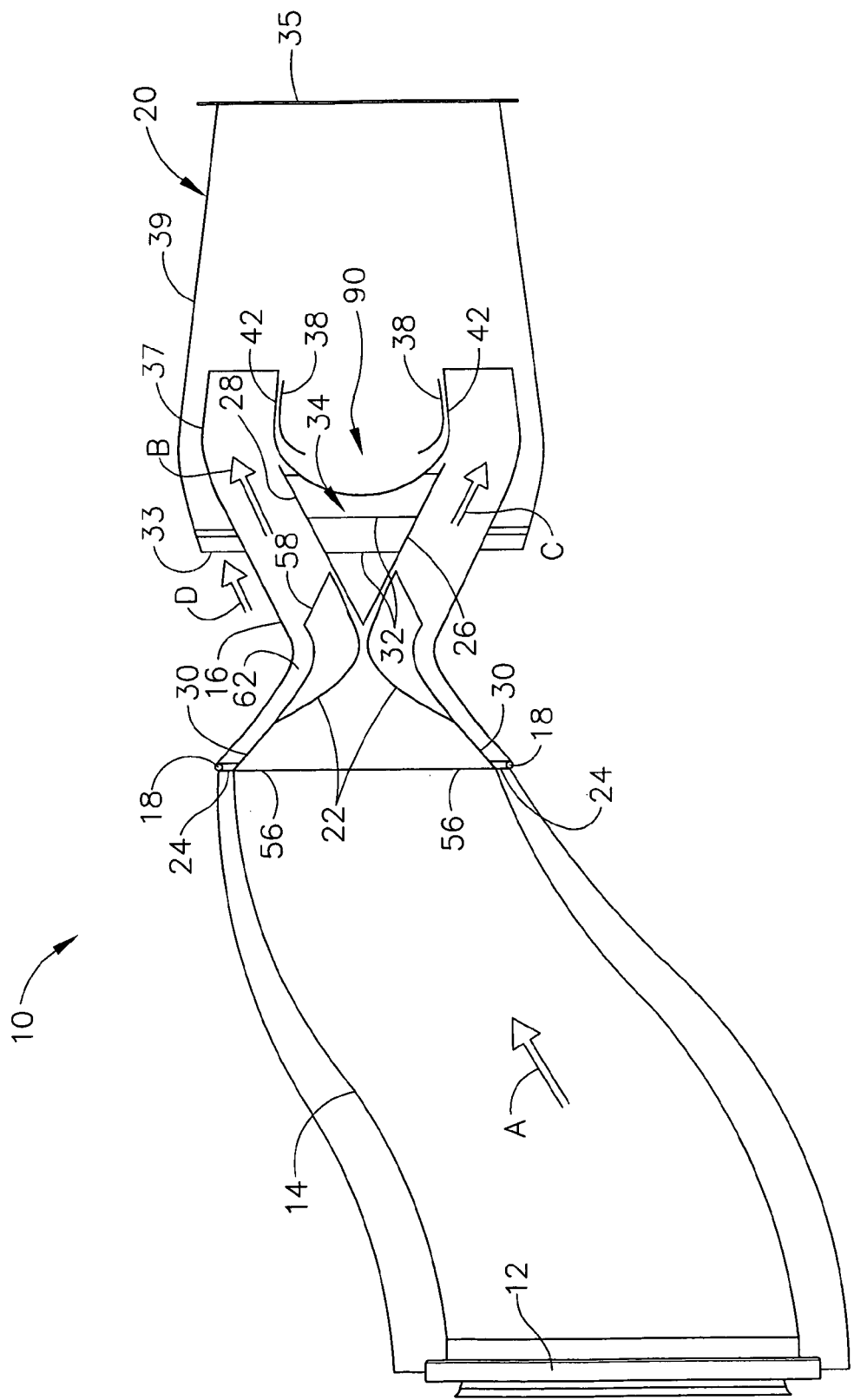
FIG. 3 is an upright, vertical section view in elevation through the middle of infrared suppressor assembly 10 shown in FIGS. 1 and 2.

FIG. 3 is an upright, vertical section view in elevation through the middle of assembly 10 shown in FIGS. 1 and 2. Hot engine air flow enters at adapter ring 12 and flows to the right as indicated by arrow A towards a plurality of spaced-apart lobes 22, only two of which are shown in FIG. 3. (Stage I duct 14 is also referred to herein as a "lobed mixer," for reasons that will become evident below.) In various configurations, infrared suppression assembly 10 creates an induced flow resulting from entrainment with static air in that a high speed air flow A draws additional air into assembly 10. The additional air is, advantageously, cold (as compared to engine exhaust) ambient air. In this manner, infrared suppression assembly 10 acts, in part, as an ejector-type nozzle. The mass flow within assembly 10 may be increased by about 150% (total) in some configurations by this entrainment of ambient air, which enters via an opening 24 formed around the rectangular exit end of stage I duct 14 by the larger rectangular input end 18 of Stage II duct 16. Air inlets 30 of lobes 22 open into opening 24 through stage I wall 56. Each stage can be mechanically coupled to the succeeding stage using, for example and without limitation, standoff posts or sheet metal wiggle strips.

Lobes 22 are spaced from one another in two rows. Lobes 22 are spaced in two horizontal rows perpendicular to the plane of FIG. 3, wherein the two rows are vertically separate from one another, as shown in FIG. 3. Therefore, lobes 22 only partially impede high speed flow A. A single forward (or "hot") baffle 26 is provided in hot high speed air flow A behind lobes 22. Wedge-shaped forward baffle 26 splits flow A into two approximately equal flows B and C and also serves to hide lobes 22 from a line-of-sight from an exit of stage III duct 20. Because the flows are approximately equal and mirror images of one another, a description of the top half of infrared suppression assembly 10 (i.e., a portion including only the uppermost horizontal row of lobes 22 from the viewpoint of FIG. 3) will suffice for an understanding of the present invention.

Flow A, coming from the left in FIG. 3, first hits inlets 30 of lobes 22. An exhaust flow inside stage I duct 14 that enters at ring 12 has to flow around lobes 22 and runs into forward baffle 26. Forward baffle 26 splits the exhaust flow into two flows B and C, one going up and one going down, in mirror image.

As the hot, high pressure exhaust flow races through stage II duct 16 it draws ambient, cool, outside air through opening 24. The flow of hot air between lobes 22 and over forward baffle 26 surface 28 draws cold air through opening 24 as a result of a reduction in pressure. The cold air drawn through opening 24 passes alongside columns of hot air, thereby cooling an exiting gas stream flowing up and over baffle 42, from which the exiting gas stream flows into stage III duct 20, which acts as another ejector nozzle that pulls in more cold air into voids denoted by 34 and 90 and into opening 33, all of which are open to the atmosphere.

Forward baffle 26 splits the hot, high pressure exhaust flow into two paths B and C. Forward baffle 26, which is substantially "V" shaped may include, in some configurations, a strut or other supporting structure 32. Forward or hot baffle 26 and cold baffle 42 together comprise a single baffle assembly, distinguishing it from previous designs that utilize a plurality of baffle assemblies. Cold baffle 42 is used to shield forward or hot baffle 26 as seen from an exit direction (i.e., looking into the exhaust exit of stage III duct 20). As used herein, a "single baffle assembly" is defined as a combination of a single hot baffle and a single cold baffle. Lobes 22 may also be present in a single baffle assembly, as may shields 38, farther described below. However, an assembly having a plurality of forward or hot baffles, a plurality of cold baffles, or a plurality of both, is excluded from the term "single baffle assembly," and rather is referred to herein as a "plural baffle assembly." Moreover, a "single baffle infrared suppressor," such as infrared suppressor assembly 10, is referred to herein as a "single baffle infrared suppressor" configuration when it includes exactly one single baffle assembly and no plural baffle assemblies.

A cold air flow is guided into a recess or void 90 inside cold baffle 42, drawn from inlets 33. This air is drawn around into the top and bottom surfaces of cold baffle 42 (as shown in FIG. 3) and further guided by shields 38. Additional air is brought in at both sides of cold baffle 42, i.e., above and below the plane of FIG. 3. This additional air is brought in towards the plane of FIG. 3. Shields 38, which block the view of cold baffle 42 from the exhaust side, can be mounted to cold baffle 42 by a plurality of pins (not shown in the Figures), such as steel pegs, screws, bolts, standoffs, or rivets. These pins can be thermally conductive, to provide additional cooling of the surfaces of shields 38 and/or cold baffle 42. Other portions of the apparatus can be assembled using such pins as well.

Thus, a combination of holes or slits that allow air to enter void 34, the ejector action of forward baffle 26 drawing cold air upward and downward, and the guiding action of shields 38, a sheet of cold air mixes with hot exhaust exiting around forward baffle 26.

Line of sight shields (not shown in the Figures) can be provided to prevent a viewer looking upstream from exhaust end 35 from seeing hot parts of stage I duct 14. For example, mixer lobes 22 would normally be running hot because there is hot gas flowing underneath it. Line of sight shields can be added to prevent an observer from viewing lobes 22 looking into exhaust end 35.

Figure 4:
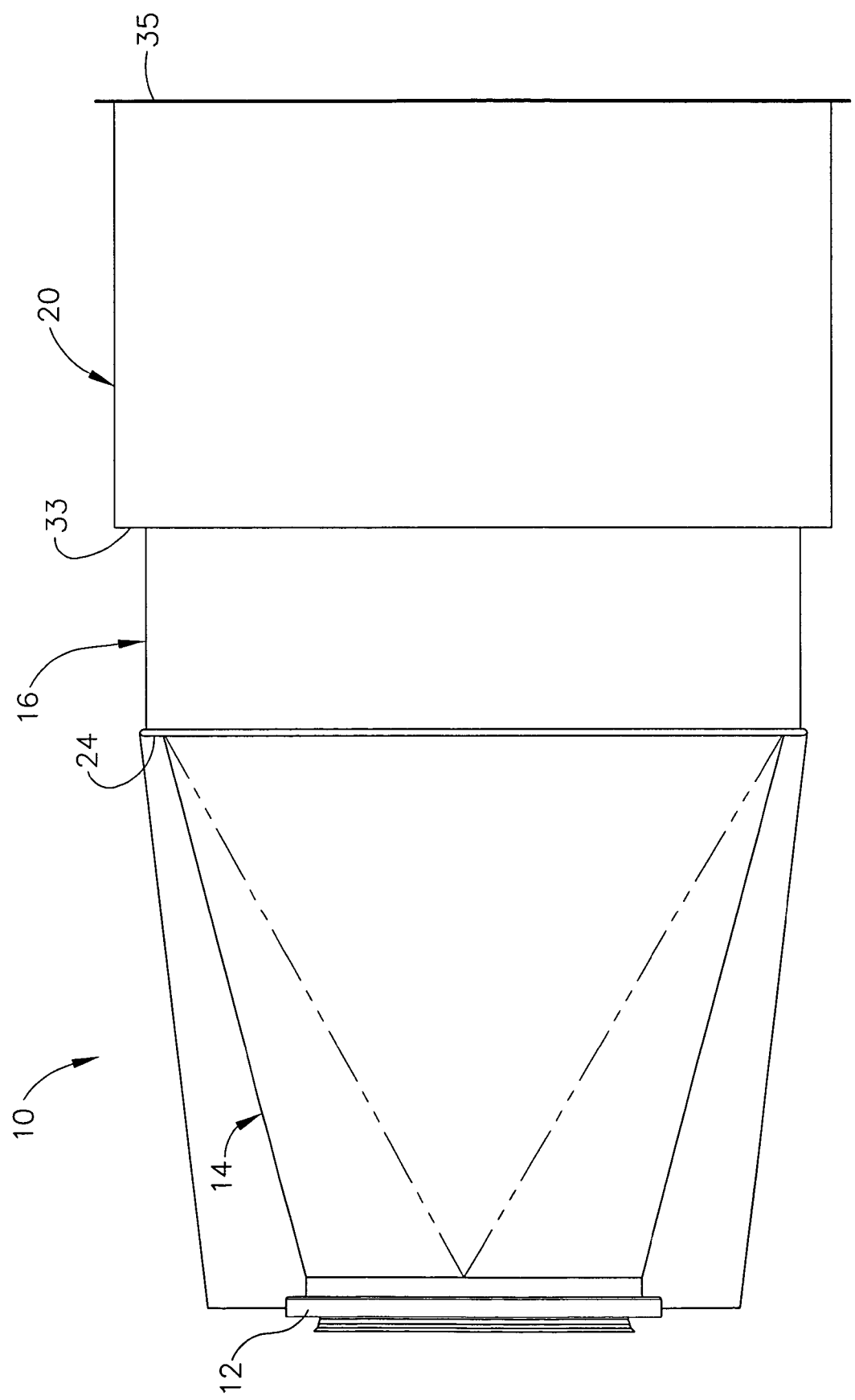
FIG. 4 is a top view of the infrared suppressor assembly of FIG. 1.

FIG. 4 is a top view of suppressor assembly 10. Adapter ring 12 is shown at the left, stage II duct 16 at the center, and stage III duct 20 at right.

Figure 5:
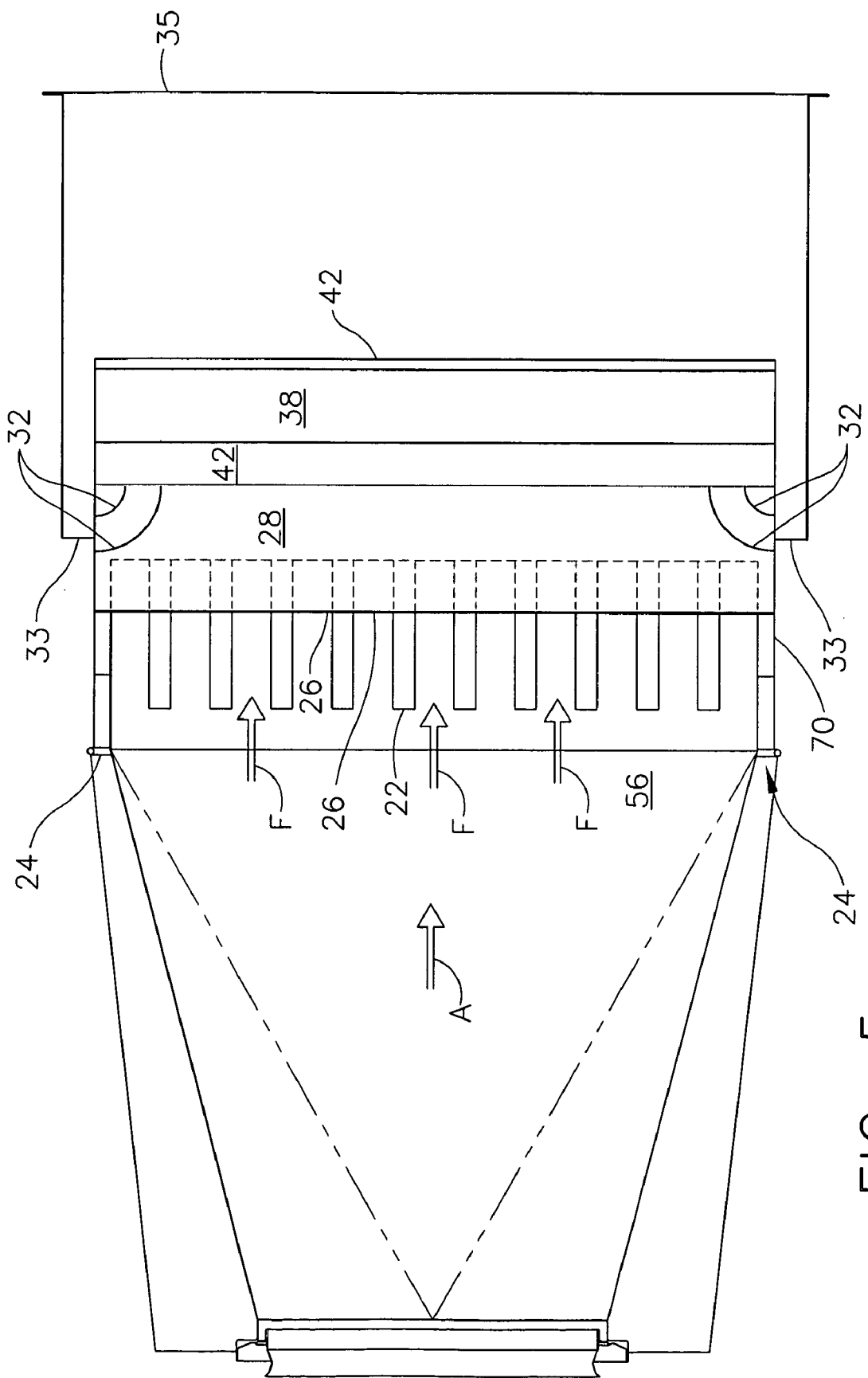
FIG. 5 is a centerline horizontal section through the infrared suppressor assembly of FIG. 1 along line 5-5, looking at the bottom half of the assembly with the top half removed. The centerline follows a curved axis of the assembly of FIG. 1.

FIG. 5 is a centerline horizontal section through assembly 10, looking at the bottom half of the assembly with the top half removed. (Note that the centerline through FIG. 1, which illustrates a turned configuration of stage I duct 14, is not straight. In configurations in which stage I duct 14 is not turned, the centerline would be straight.)

Figure 6:
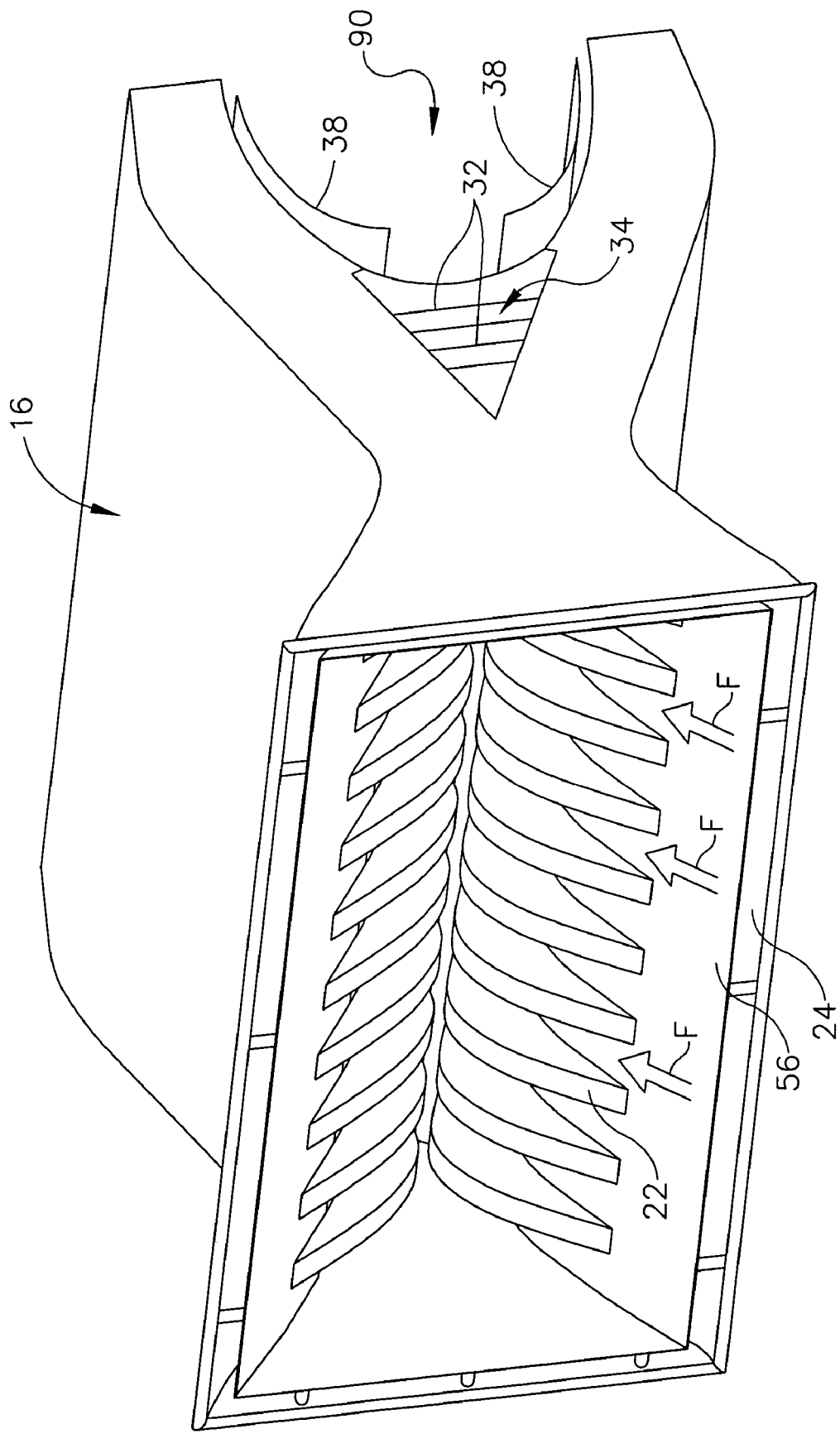
FIG. 6 is a 3-D view of a stage II duct of the infrared suppressor assembly of FIG. 1 and including a mixing portion of stage I duct.
Figure 7:
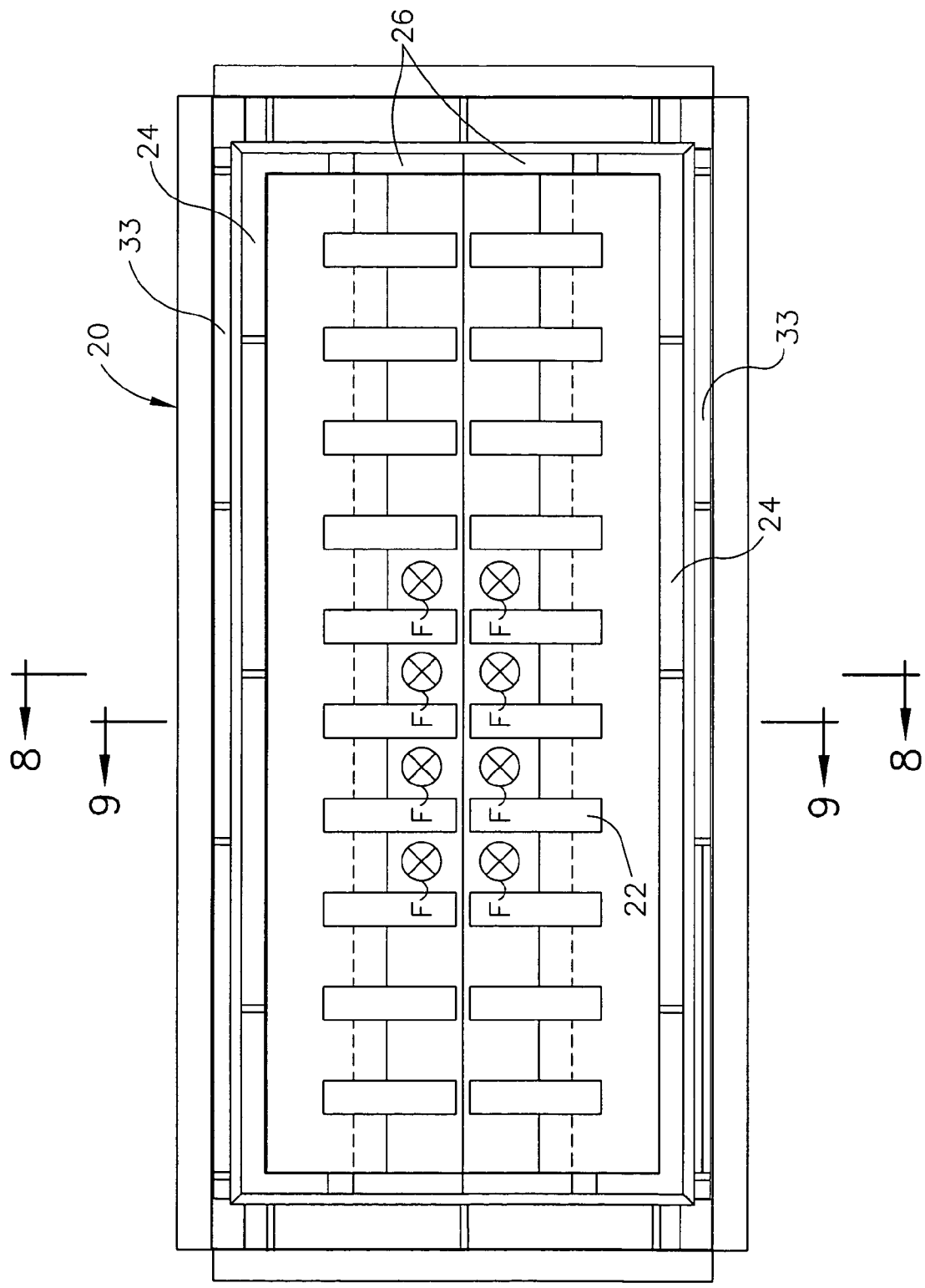
FIG. 7 is a forward-looking view aft of the stage I and II ducts shown in FIG. 6 and viewed in the direction of exhaust gas flow.

FIG. 6 is a partial cut-away perspective view of stage II duct 16, including the mixer section of stage I duct 14, and FIG. 7 is a view looking into the mouth of stage II duct 16, in the direction of exhaust gas flow. The incoming high pressure hot air flow is broken into a plurality of flows F (only a few of which are shown in the Figures, and those shown in FIG. 6 and FIG. 7 are not necessarily corresponding flows F) that flow between and past lobes 22.

FIGS. 6 and 7 are provided for orientation purposes. FIG. 6 is a sectional perspective view that is cut-away directly upstream of lobes 22 in stage II duct 16. Wall 56 is of stage I duct 14 and the duct mixer section, and is shown inside stage II duct 16.

Figure 8:
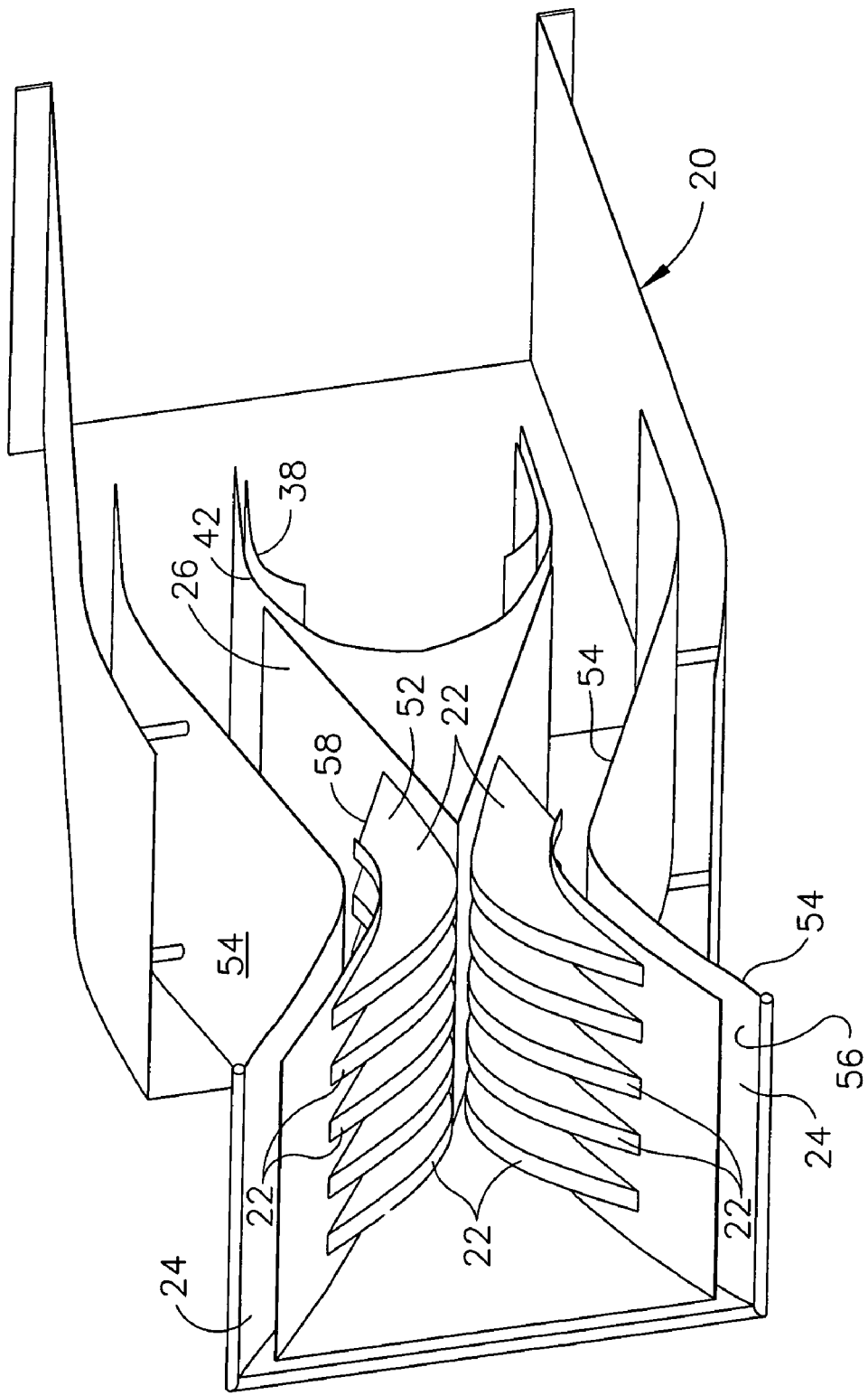
FIG. 8 is an isometric perspective centerline section in elevation through line 8-8 of FIG. 7.

FIG. 8 is a perspective centerline section in elevation through line 8-8 of FIG. 7. This section slices through two lobes 22, one above a horizontal centerline of stage II duct 16 and one below and shown at the right of the upper and lower lobe groupings. Since the bottom section of stage II duct 16 is a mirror image of the top section, the discussion here will be confined to the top section. The right-most upper lobes 22 shown in FIG. 8, is shown cut in half. Another section along line 9-9 shown in FIG. 7 goes through two lobes 22. This section is illustrated in FIG. 9.

Figure 9:
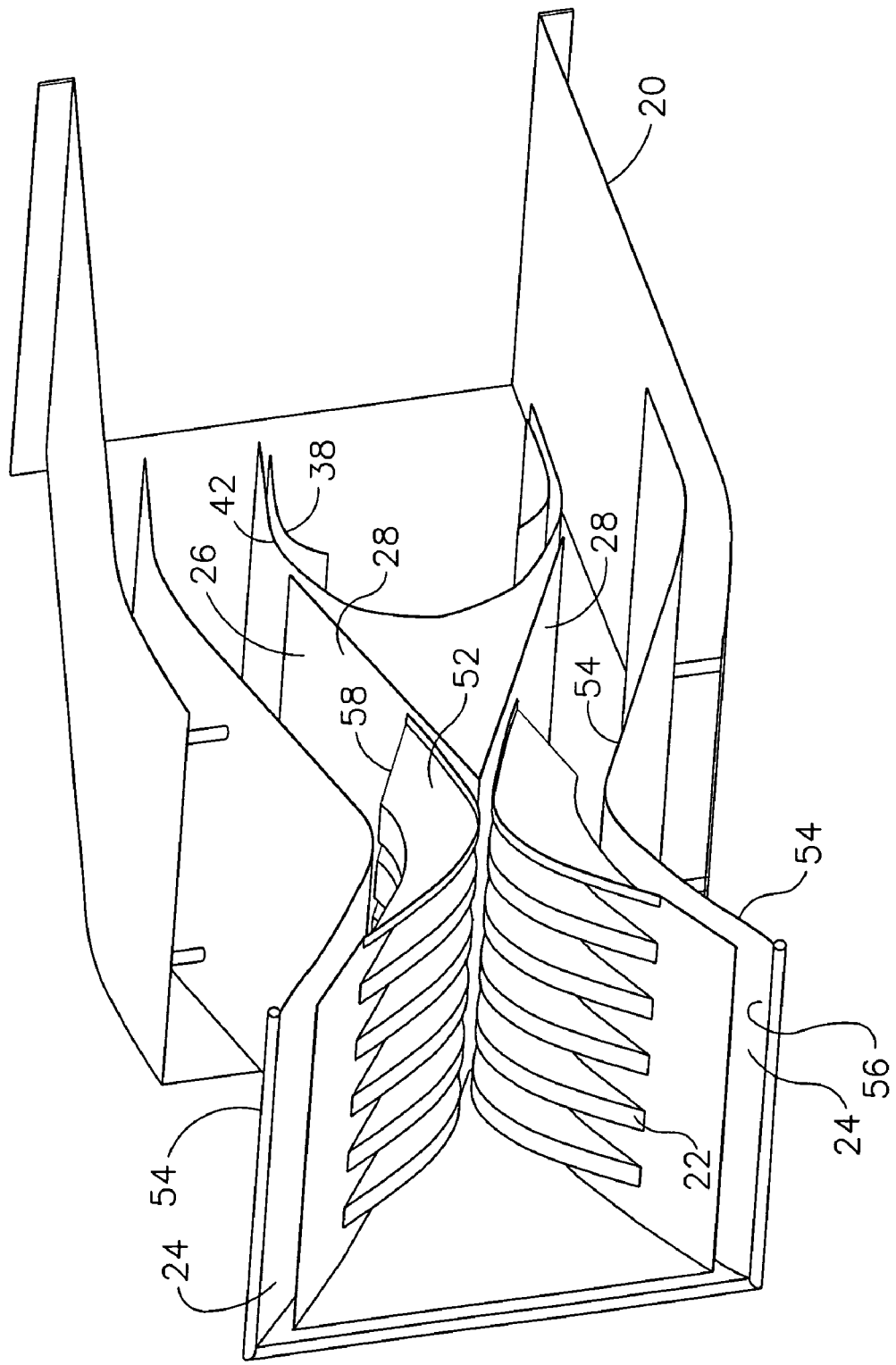
FIG. 9 is a section along line 9-9 shown in FIG. 7.

Referring to FIG. 9, flows of ambient outside ambient air are drawn into a gap 24 between a wall 56 of stage I duct 14 and an outer wall 54 of stage II duct 16. Cold ambient air is injected through this opening or gap 24, at least part of which expands into lobes 22. Hot exhaust air entering from the left side of FIG. 9 flows between the various lobes 22. Lobes 22 are hollow to allow cold air entering from gap 24 to pass into inlets 30 (not shown in FIG. 9, but shown in FIG. 10) through wall 56 of stage I duct 14 so that cold air is in lobes 22 as hot exhaust air passes between them. Ends 58 of lobes 22 are open to thereby exhaust the cold air drawn into lobes 22 into a duct between forward baffle 26 and outer wall 54 of stage II duct 16. While in lobes 22, the cold air is next to the hot exhaust stream, separated from it by lobe side walls 52.

Some ambient cold air not entering lobes 22 flows through gap 24 into a region between surfaces 28 of forward baffle 26 and wall 54. This flow is made clearer by reference to FIG. 10, which is a perspective view of a portion of stage II duct 16 looking down at inlets 30 with outer wall 54 of stage II duct 16 removed. Forward baffle 26 is also shown. Lobes 22 draw cold air from gap 24 through wall 56. Thus, when hot air flows F emerge to strike hot baffle 26, they are surrounded on two sides by cold air coming from lobe ends 58 and on the top (in the visible portion seen in FIG. 10) by cold air guided by segments 62 of wall 56, so that hot air flows F are surrounded on three sides by cold air. (At both the extreme left and right, a cold air flow directly from gap 24 replaces one of the cold air flows from lobe ends 58 around hot air flow F.) The hot air from flows F, the cold air from lobe ends 58 and the cold air riding over segments 62 hits and flows along the outside surface of hot baffle 26 and mixes.

Stage I duct 14 can be referred to as a "lobed mixer," because of the presence of lobes 22 and the mixing of cold ambient air in lobes 22 with the hot exhaust between lobes 22.

More particularly, hot exhaust gasses from an aircraft engine are directed into the lobed mixer of single baffle infrared suppressor 10, which includes a single baffle assembly comprising forward or hot baffle 26, cold baffle 42, and shields 38. The direction of hot exhaust from the engine in conjunction with cold air entering through gap 24 generates alternating flows of hot exhaust gas and cold air. These alternating flows are directed towards the single baffle assembly to mix the hot exhaust gas with the cold air to cool the emission from the engine to thereby reduce infrared emissions. The practical use of a single element baffle assembly in a single baffle infrared suppressor 10 is made possible by, among other things, the use of a lobed mixer. This mixer rapidly and effectively mixes engine bay cooling air in the engine exhaust with cold air to reduce or eliminate hot streaks, which are portions of unmixed engine exhaust air. These hot streaks are a strong plume signature contributor, a source of radiation heat transfer to stage II duct walls, and where it persists further into suppressor 10, a source of hot streaks in stage II or stage III walls. Hot streaks cause the exhaust plume to become a significant contributor to an IR signature at close range. In various configurations, an additional flow path of cold air guided in part by segments 62 between lobe inlets 30 is provided so that the hot exhaust flows are surrounded on three sides by cold air.

Figure 11:
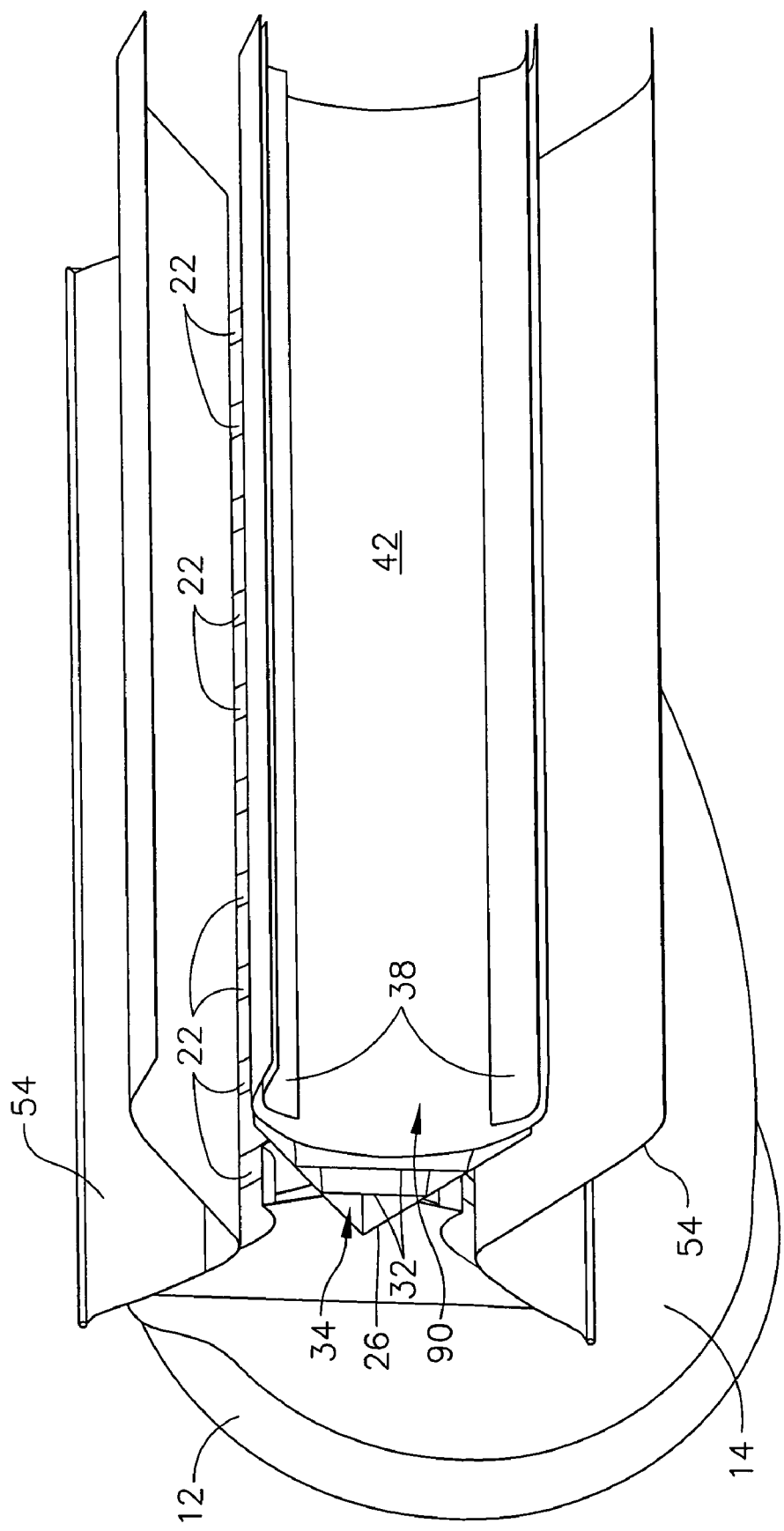
FIG. 11 is an oblique perspective view from the rear stage II duct and the stage I duct and the adapter ring of the infrared suppressor assembly of FIG. 1, but omitting the stage III duct and some connecting standoffs that support various structures within the infrared suppressor assembly.

FIG. 11 is an oblique perspective view from the rear stage II duct 16 and stage I duct 14 and adapter ring 12, but omitting stage III duct 20 and some connecting standoffs that support various structures within infrared suppressor 10. Shields 38 and cold baffle 42 entrain some cool air as seen from this view as does void 34 behind forward baffle 26. These cool surfaces and cool air shield the hot exhaust gas flow A and hot surfaces within suppressor 10 from the view of infrared sensors looking up into stage III duct 20. In addition, cool air flowing over cold baffle 42 (i.e., over the top, or under the bottom mirror image portion) is also mixed with hot exhaust air so that only relatively cool air is seen leaving stage III duct 20.

Figure 12:
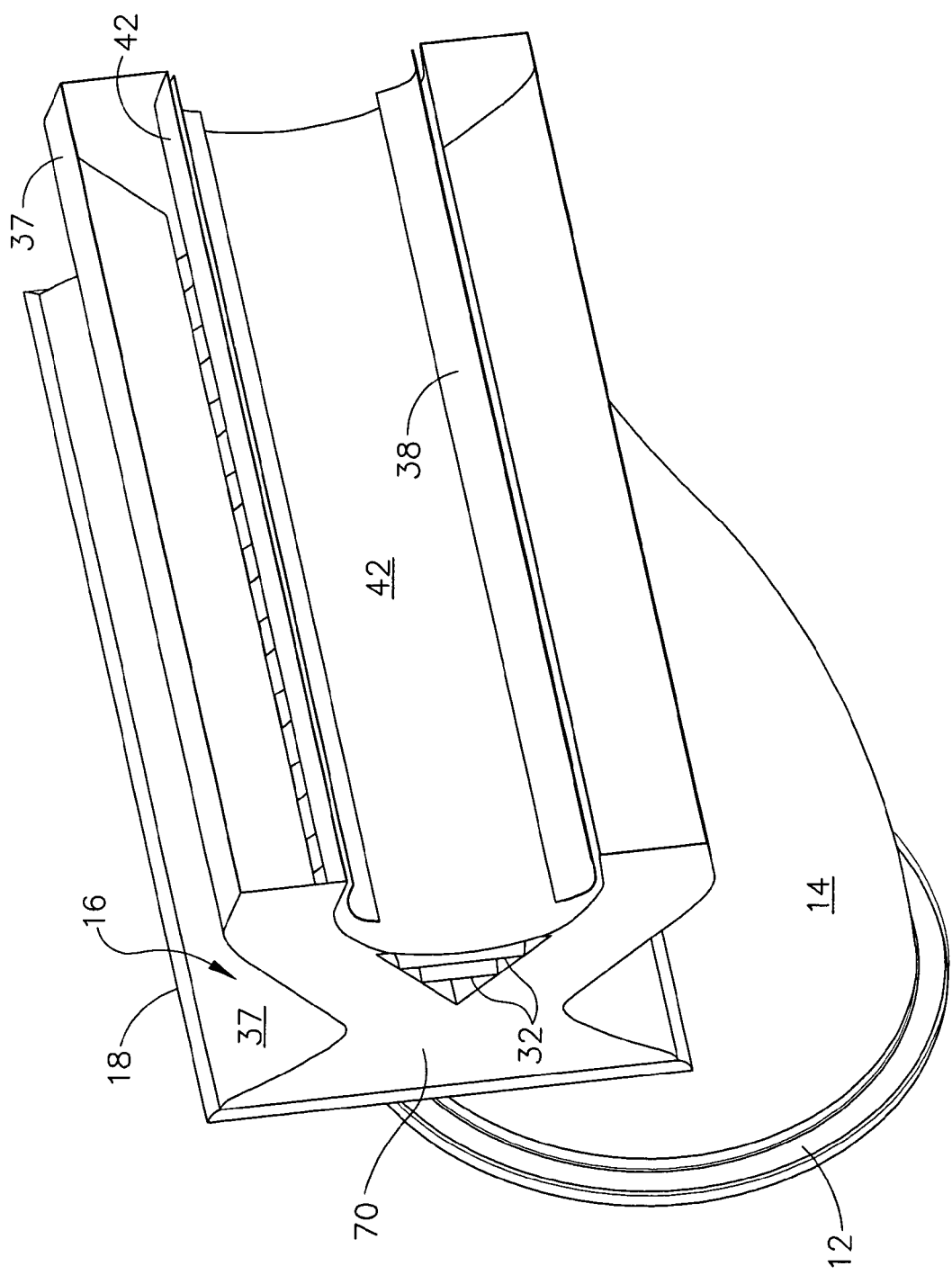
FIG. 12 is a figure similar to FIG. 11 but also shows a side wall having a flow guide as shown in FIG. 5.

FIG. 12 is similar to FIG. 11 but also shows a side wall 70 having a flow guide 32 as shown in FIG. 5. Flow guide 32 channels cold ambient air from in front of the flow guide such that the air enters and cools a recess inside cold baffle 42.

Figure 13:
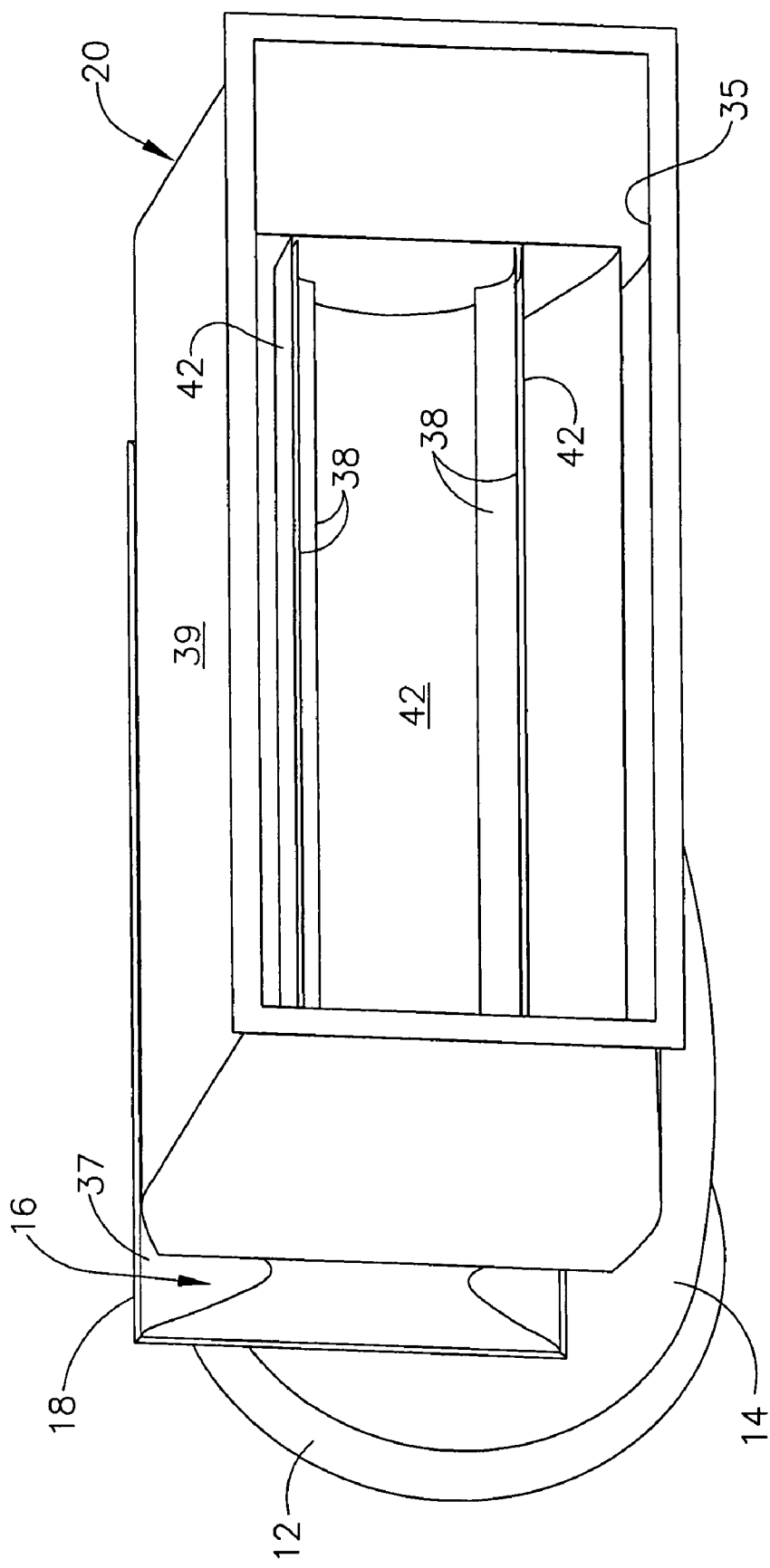
FIG. 13 is a rear perspective view of a fully assembled infrared suppressor assembly of FIG. 1, showing that hot surfaces and hot air flows within the suppressor assembly are effectively shielded from view from infrared sensors that look into the stage III duct or at the sides of suppressor 10.

FIG. 13 is a rear perspective view of a fully assembled suppressor 10, showing that hot surfaces and hot air flows within suppressor 10 are effectively shielded from view from infrared sensors that look into stage III duct 20 or the sides of suppressor 10.

To summarize, a flow of hot exhaust air flows into stage I duct 14, and is split into two flows B and C after going through a mixer that comprises stage II duct 16. Cold air is injected or entrained into the hot air stream, slowing down and cooling the air, as well as increasing the mass flow (by about 50% in some configurations). Surfaces of forward baffle 26 become hot, so a second injector comprising a cold air inlet 33 injects additional cold air to cool inner surfaces of suppressor 10 and shield hot surfaces from visibility. Additionally, forward baffle 26 is shielded from view from the back end of suppressor 10 by cold baffle 42 and shields 38. Cold air entering from voids 34 is distributed laterally, and cools cold baffle 42. Thus, when infrared suppressor assembly 10 is viewed from any direction, there is very little or no hot air or hot surface area visible. In addition to being very effective at suppressing infrared emissions, assembly 10 is also relatively simple and low weight.

A purged air flow P comes from the left and right sides through a gap 24 as viewed from the vantage point of FIG. 1 (only a right side gap 24 is shown in FIG. 1). Also, referring to FIG. 3, a cold air flow D also enters at 33. Some of air flow D turns and flows into void 34 between surface 28 and cold baffle 42. Also, some of air flow D flows into void 90 and between shield 38 and cold baffle 42 to create a cold air pool behind cold baffle 42. Some cold air from flow P also enters into void 34 and behind cold baffle 42 from the open sides hot baffle 26 and cold baffle 42.

Figure 10:
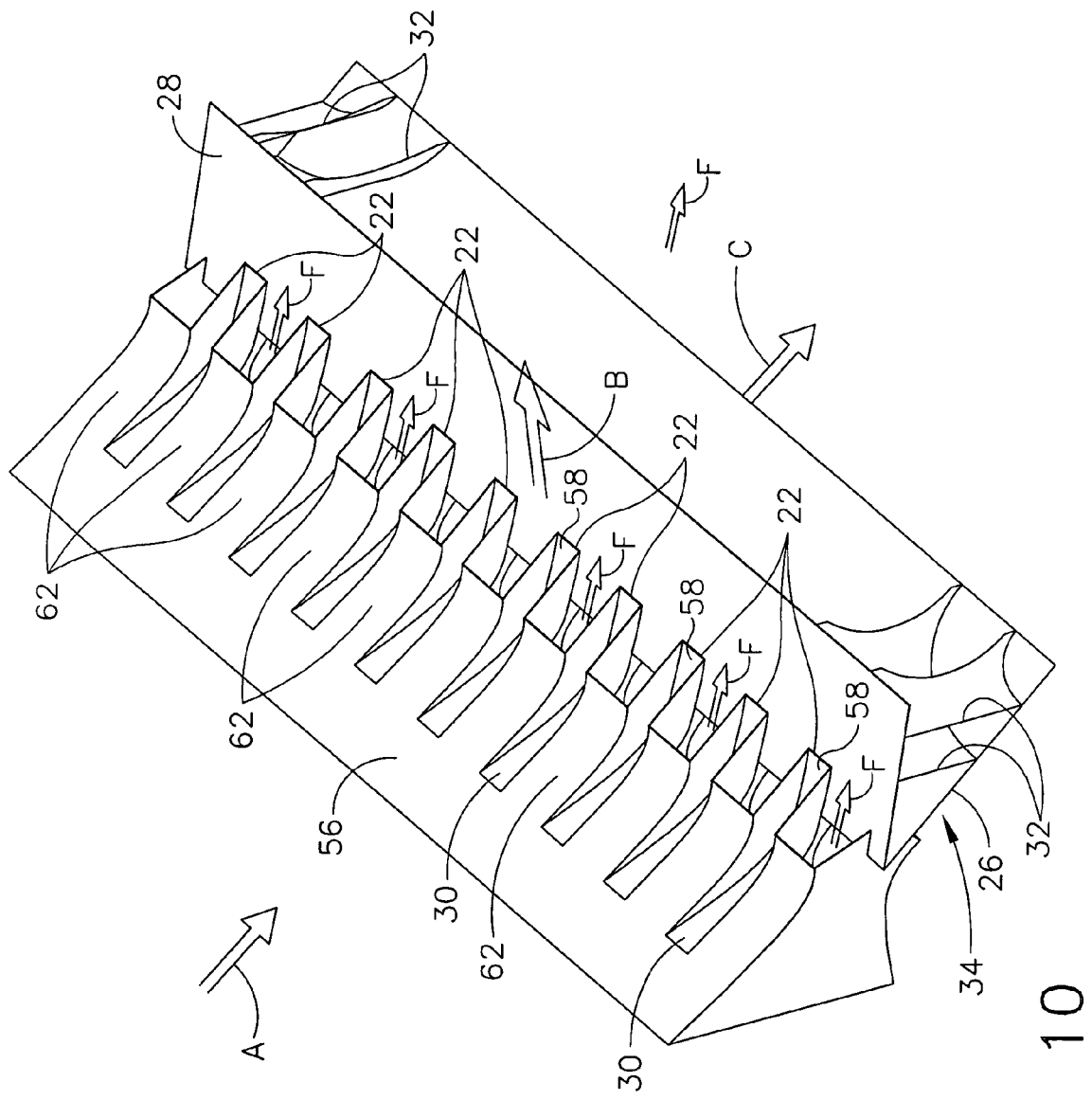
FIG. 10 is a perspective view of a portion of the stage I and II ducts shown in FIG. 6 looking down at an inlet with the outer wall of the stage II duct removed.

A cooling dilution flow is increased by controlling the size of areas of flow through suppressor 10. For example, the exit of stage I duct 14 is smaller and has one or more relatively large gaps 24 for cold air to enter. Discrete rectangles of hot and cold gasses (i.e., the hot air flows F and the cold flows through gaps 62 and exiting at lobe exits 58) are sized so that the hot gas that comes through is in a relatively small interlobe gap. The rectangles having the hot gas are narrowly sized (as is shown in FIG. 10) to increase the cooling flow. The amount of hot gas through the open area is selected to achieve a cooling/dilution flow ratio of approximately 1.5:1. Standard calculations based on fluid dynamic principals can be used to select the sizes.

The flow of gasses through suppressor 10 is also contoured. Whereas known prior art suppressors had a stage II duct 16 barely fitting into a stage III duct 20, some configurations of the present invention have a stage III duct 20 that parallels stage II a much longer distance. In this manner, stage III duct 20 thus has an extended inlet flowpath through gap 33. In the known prior art configurations, for example, the amount that stage II duct 16 fits into stage III duct 20 is just enough to allow the ducts to stay put when connected with spacers. A substantially greater overlap is provided to improve cooling of stage II walls 37.

In various configurations of the present invention, a coating, or combination of coatings, is applied to surfaces to further suppress infrared radiation. Any suitable coating may be used, including black spray paint. However, increased durability and performance may be achieved with other coatings, including various proprietary and non-proprietary coatings known in the art for use with suppressors.

The total angle of the bend in curved stage I duct 14 in some configurations of the present invention is at least about a 15 degree change in the axis from adapter ring 12 and gap 24. This bend results in the axis of suppressor 10 being about 15 degrees tilted with respect to an attached engine. In some configurations, the angle of the bend and the tilt can be as high or higher than 30 degrees. From gap 24 aft, some configurations (not shown in the Figures) provide additional curvature. The bending of the axis of suppressor 10 is not required in all configurations of the present invention, and can be provided at various angles dependent upon the aircraft on which suppressor 10 is to be used. In general, the bend is limited in that suppressor 10 has to fit the aircraft engine and structure. In some configurations, the bend is away from the fusilage of the aircraft.

It will thus be evident that configurations of the present invention provide improved protection against threats even with increased engine exhaust gas temperatures and requirements for increased power and reduced overall weight. In particular, the lobed mixer rapidly and effectively mixes engine bay cooling air into the engine exhaust to reduce or eliminate hot streaks that otherwise would be a strong plume signature contributor, a source of radiation heat transfer to the stage II walls, and even a generator of hot streaks in the stage II and stage III walls. The lobed mixer thus has a significant benefit on IR signature reduction. The use of shields 38 also reduce the signature from slightly above and below the suppressor axis in a purged air space. In some configurations, overall cooling/dilution flow is significantly increased to 1.5:1, resulting in significantly reduced plume temperatures to reduce plume signature, suppressor core heat load, and aircraft fuselage heat load. In addition, an extended and contoured inlet flowpath provides a more uniform stage III cooling film and "backside" cools the stage II wall. In configurations in which the suppressor axis is realigned outboard, the suppressor exhaust is directed further outboard to prevent its washing the aft fuselage, resulting in a significant signature reduction from the aircraft.

While the invention has been described in terms of various specific embodiments, those skilled in the art will recognize that the invention can be practiced with modification within the spirit and scope of the claims.

What is claimed is:

1. A method for suppressing infrared radiation from an aircraft engine, said method comprising:
    directing hot exhaust from the aircraft engine into a lobed mixer of a single baffle infrared suppressor having a single baffle assembly to generate alternating flows of hot exhaust gas and cold air;
    directing the alternating flows of hot exhaust gas and cold air towards the single baffle assembly to facilitate mixing the hot exhaust gas with the cold air; and
    cooling the hot exhaust gas and cold air mixture in a duct having an extended inlet flowpath.

2. A method in accordance with claim 1 further comprising providing an additional flow path for cold air so that said hot air flows of said alternating hot exhaust gas and cold air flows are surrounded on three sides by cold air.

3. A method in accordance with claim 2 further comprising shielding a forward or hot baffle of the single baffle assembly in an exit direction using a cold baffle.

4. A method in accordance with claim 3 further comprising shielding the cold baffle in the exit direction.

5. A method in accordance with claim 3 further comprising guiding cold air into a recess inside the cold baffle.

6. A method in accordance with claim 1 further comprising providing a cooling/dilution flow ration of approximately 1.5:1.

7. A method in accordance with claim 1 wherein the single baffle infrared suppressor has an axis of at least about 15 degrees relative to an axis of an adaptor ring configured to slide over a tailpipe of the aircraft engine.

8. An infrared suppressor for an aircraft engine, said apparatus comprising a lobed mixer and one single baffle assembly, said apparatus further configured to:
    direct hot exhaust from the aircraft engine into said lobed mixer to generate alternating flows of hot exhaust gas and cold air;
    provide an additional flow path for cold air so that said alternating flows of hot exhaust gas and cold air are surrounded on three sides by cold air and
    direct the alternating flows of hot exhaust gas and cold air towards the single baffle assembly to mix the hot exhaust gas with the cold air.

9. An infrared suppressor in accordance with claim 8 wherein said single baffle assembly comprises a forward or hot baffle and a cold baffle, and said apparatus is further configured to shield said forward or hot baffle in an exit direction using said cold baffle.

10. An infrared suppressor in accordance with claim 9 further comprising shields configured to shield said cold baffle in an exit direction.

11. An infrared suppressor in accordance with claim 10 further configured to guide cold air into a recess inside the cold baffle.

12. An infrared suppressor in accordance with claim 8 further comprising a stage III duct having an extended inlet flowpath and additionally configured to further cool the mixed hot exhaust gas and cold air in said stage III duct.

13. An infrared suppressor in accordance with claim 8 further comprising an adapter ring configured to slide over a tailpipe of the aircraft engine and having an axis turned at least about 15 degrees relative to an axis of the adapter ring.

14. An infrared suppressor in accordance with claim 8 wherein lobes of said mixer are hidden from a line-of-sight from an exit of said infrared suppressor.

15. An infrared suppressor in accordance with claim 14 wherein said single baffle assembly comprises a forward baffle and a cold baffle, and said apparatus is further configured to shield at least one of said forward baffle and said cold baffle in an exit direction.

16. An infrared suppressor in accordance with claim 8 further configured to provide an additional flow path for cold air so that alternating flows of hot exhaust gas and cold air are surrounded on three sides by cold air.

17. A method for suppressing infrared radiation from an aircraft engine, said method comprising:
- directing hot exhaust from the aircraft engine into a lobed mixer of a single baffle infrared suppressor having a single baffle assembly to generate alternating flows of hot exhaust gas and cold air;
- directing the alternating flows of hot exhaust gas and cold air towards the single baffle assembly to mix the hot exhaust gas with the cold air; and
- shielding lobes of the lobed mixer from a line of sight from an exit direction for the mixture of hot exhaust gas and cold air.

18. A method in accordance with claim 17 further comprising providing an additional flow path for cold air such that said hot air flows of said alternating hot and cold air flows are surrounded on three sides by cold air.

* * * * *

UNITED STATES PATENT AND TRADEMARK OFFICE
CERTIFICATE OF CORRECTION

PATENT NO.       : 7,607,305 B2
APPLICATION NO. : 11/196218
DATED            : October 27, 2009
INVENTOR(S)      : Steyer et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1120 days.

Signed and Sealed this

Twelfth Day of October, 2010

David J. Kappos
*Director of the United States Patent and Trademark Office*